UNITED STATES PATENT OFFICE 2,374,369

SATURATED AND UNSATURATED 17-HYDROXYANDROSTANES, THEIR DERIVATIVES AND SUBSTITUTION PRODUCTS AND PROCESS OF MAKING SAME

Karl Miescher, Riehen, and Albert Wettstein, Basel, Switzerland, assignors to Ciba Pharmaceutical Products, Incorporated, Summit, N. J., a corporation of New Jersey No Drawing. Original application December 26, 1940, Serial No. 371,832. Divided and this application October 22, 1942, Serial No. 462,989. In Switzerland December 23, 1939

11 Claims. (Cl. 260—397.4)

It has been found that saturated and unsaturated 17-hydroxy-androstanones or their derivatives (for example, esters, ethers) or substitution products with saturated or unsaturated hydrocarbon residues may be obtained by treating androstane-17-ones, containing only double bonds in the rings A and B, with agents capable of transforming the group —CO— into the group —CR(OH)—, R representing hydrogen or a saturated or unsaturated hydrocarbon radical, treating the 17-carbinols obtained if desired with esterifying or etherifying agents, hereupon reacting the products with oxidising agents, capable of introducing into the α-position of a double bond a member of the group of oxygen and oxygen containing groups, and, finally, if desired, allowing hydrolysing and/or oxidising or dehydrogenating agents, respectively, to act upon the products thus obtained.

The parent materials named may be obtained, for example, by the degradation of the side chain in dimethyl - cyclopentano - polyhydrophenanthrene compounds containing side chains and corresponding nuclear double bonds as described in patent application Serial No. 371,058, filed December 20, 1940 (now Patent No. 2,319,012, granted May 11, 1943). The double bonds may be located in particular in the 2, 3, 4, or 5 position.

Agents which are capable of transforming the group —CO— into the group —CR(OH)—, R having the meaning given above, are reducing agents in the widest sense of the term, as well as, for example, metallo-hydrocarbon compounds, such as Grignard's reagents, alkali-hydrocarbon compounds and the like, which, in addition to reducing the 17-keto group, are capable of introducing in the same position an additional saturated or unsaturated hydrocarbon radical, for example, a methyl, ethyl, allyl, or acetylene group. The 17-carbinols thus obtained, particularly those having secondary alcohol groups, are converted, if desired, into their corresponding esters or ethers in known manner by the action of esterifying or etherifying agents. In this instance, particular use is made of esterifying agents which are capable of introducing aliphatic acid radicals, such as those of formic, acetic, propionic, n- or iso-butyric, n- or iso-valeric, caproic, capric, palmitic, or stearic acids, furthermore aromatic, fatty aromatic or inorganic acid radicals, examples being benzoic acid, cinnamic acid or substituted carbonic acid radicals. For the etherification, aliphatic or aliphatic-aromatic alcohols or phenols, for example, methyl, ethyl, benzyl alcohols, triarylmethyl-carbinols and the like, are introduced.

Upon the reaction products thus obtained oxidising agents are now caused to react which are capable of introducing in a manner of itself known in the α-position to a double bond, oxygen or groups containing oxygen, such as oxo, hydroxy or substituted hydroxyl groups. For this purpose, as is known, for example chromic acid, selenium dioxide, lead tetracylates, etc. may be used. In order, for example, to convert substituted hydroxyl groups into free hydroxyl groups, further treatment is given if desired with hydrolysing agents, in which case it is also possible, by cautious working, to hydrolyse partially only the newly introduced substituents in rings A or B, but not the possibly substituted hydroxyl group in the 17 position; therefore, in these instances, it is advantageous if the 17-carbinol group has already been substituted by a difficultly hydrolysable radical.

In this manner, compounds of the dimethyl-cyclopentanopolyhydrophenanthrene series have been obtained which contain a free, esterified or etherified hydroxyl group and furthermore, if desired, also a hydrocarbon radical in the 17 position, and which contain in rings A or B, keto groups or free or esterified hydroxyl groups in the α-position to double bonds. From the compounds which carry hydroxyl groups, the desired ketones, saturated or unsaturated 17-hydroxy-androstanones, their derivatives or substitution products, may then be obtained in a manner of itself known by the action of oxidising or dehydrogenating agents.

The following formulae explain some of the above reactions without in any way limiting their scope;

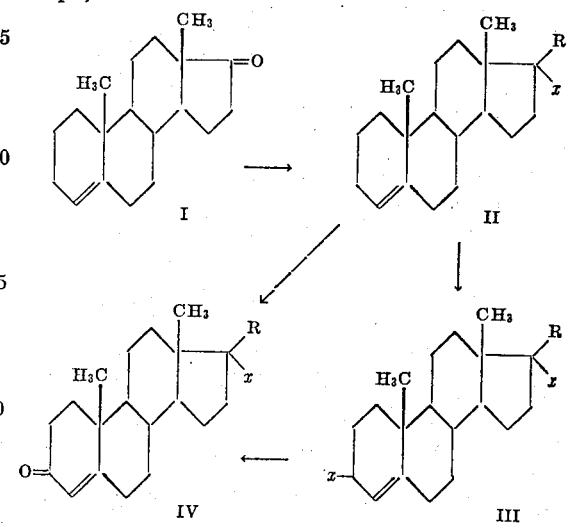

x=free or substituted hydroxyl group.
R=hydrogen, saturated or unsaturated hydrocarbon radical.

Example 1

1 part of Δ⁴-androstene-17-one of Formula I (prepared, for example, according to the instructions given in U. S. Patent No. 2,319,012, by splitting the side chain in Δ⁴-cholestene) is dissolved in 25 parts of pure alcohol and is hydrogenated by means of a nickel catalyst, prepared, for example according to the methods of Rupe or Raney. After 1 molecule of hydrogen has been absorbed, the hydrogenation is stopped, the catalyst is removed by filtration, the filtrate is evaporated in vacuo, and the residue is dissolved in 6 parts of absolute pyridine. 2 parts of propionic acid anhydride are now added. The solution is maintained for 16 hours at room temperature, after which it is poured into 50 parts of water. The ester which crystallises out after the decomposition of the anhydride is filtered off at the pump, washed with water and dried in a vacuum exsiccator. By recrystallisation from hexane, pure Δ⁴-androstene-17-ol-propionate is obtained in colourless crystalline form. It corresponds with the Formula II, in which $x$ stands for —OCO—$C_2H_5$ and R for H.

Instead of by a catalytic method other reduction methods known to be suitable for the conversion of a keto group into a carbinol group may be used, for example nascent hydrogen, like an alkali metal and an alcohol, further an organo-metal compound prone to the formation of unsaturated hydrocarbons, like iso-propyl magnesium iodide, or even biochemical or electrochemical means. In place of propionic acid anhydride, other propionylating agents may naturally be used, for example, a propionic acid halide, or other desired esters or even ethers may be formed.

In place of the radical of propionic acid, other ester or ether radicals may be introduced, for example those named before, or the new carbinol group may rest unprotected if suitable oxidising agents, for example selenium dioxide, are chosen for the following oxidation.

If, instead of using Δ⁴-androstene-17-one as parent substance, a parent substance which is unsaturated in another position be used, for example, Δ²-, Δ³- or Δ⁵-androstene-17-one, the corresponding unsaturated product is analogously obtained.

Thus quite generally as intermediates androstane derivatives are obtained, containing in the rings A and B only a double bond in which the carbon atom 5 may participate, and in 17-position a free, esterified or etherified hydroxyl group; for example the Δ⁴-androstene-17-ol-acylates.

1 part of this Δ⁴-androstene-17-ol-propionate is dissolved in 50 parts of glacial acetic acid; a solution of 1.2 parts of chromium trioxide in a little water is added, and the mixture is stirred for 12 hours at room temperature, after which 400 parts of water are added. The reaction mixture is extracted exhaustively with ether, the ethereal solution is washed with a solution of bicarbonate and then with water and is then dried and evaporated in vacuo. From the residue, testosterone propionate (Δ⁴-androstene-3-one-17-ole-propionate of Formula IV, in which $x$ stands for —OCO—$C_2H_5$ and R for H), together with the corresponding 6-oxo- and 3:6-dioxo-compounds, is obtained by fractional crystallisation, adsorption or sublimation.

In place of chromic acid, selenium dioxide or a lead tetraacylate, for example, may be used for the oxidation. In this case, a Δ⁴-3-hydroxy- or -acyloxy-androstene-17-ole-propionate of the Formula III is primarily obtained, which may subsequently be converted into testosterone propionate, if necessary after partial hydrolysis of only the 3-ester group, by the action of oxidising or dehydrogenating agents in a manner of itself known.

Example 2

1 part of Δ⁴-androstene-17-one of Formula I is dissolved in ether and this solution is allowed to drop into a boiling solution of excess of methyl magnesium iodide in ether. After the reaction is complete, water and acid are added cautiously, the ethereal solution is removed, washed and evaporated. From the residue Δ⁴-17-methyl-androstene-17-ole of Formula II ($x$ stands for OH and R for $CH_3$) is obtained.

In a completely analogous manner compounds containing instead of a methyl other saturated or unsaturated hydrocarbon radicals may be obtained, for example the 17-ethyl, 17-ethinyl- or 17-allyl-androstene-17-oles with a double bond in 2, 3, 4, 5-position etc., by reaction with for example ethyl, ethinyl or allyl magnesium halides on the androstene-17-ones.

17-ethinyl-androstenoles like the Δ⁴-17-ethinyl-androstene-17-ole, the Δ⁵-17-ethinyl-androstene-17-ole etc., may also be prepared advantageously by the action of sodium acetylide, for example in liquid ammonia or amylene hydrate.

By energetic action of esterifying or etherifying agents the new tertiary carbinol groups in 17-position may be converted into ester or ether groups in known manner.

Thus quite generally as intermediates androstane derivatives may be obtained, containing in the rings A and B only a double bond in which the carbon atom 5 may participate, and in 17-position a free, esterified or etherified hydroxyl groups and hydrocarbon radical.

The Δ⁴-17-methyl-androstene-17-ole described above is converted in a manner fully analogous to that described in Example 1 for Δ⁴-androstene-17-ole-propionate, for example, by means of chromic acid, directly into 17-methyl-testosterone of Formula IV ($x$ stands for OH; R for $CH_3$), or also, for example, by the action of selenium dioxide or of a lead tetraacylate into Δ⁴-17-methyl-androstene-3:17-diole or its 3-mono esters. These, then, if necessary after hydrolysis, may also be converted into 17-methyl-testosterone in a manner of itself known, by means of oxidising or dehydrogenating agents. If, instead of Δ⁴-17-methyl-androstene-17-ole, corresponding compounds containing for example, an ethyl, ethinyl, ethenyl, or allyl group in the 17-position be used as parent materials, 17-ethyl-, 17-ethinyl-, 17-ethenyl-, or 17-allyl-testosterone is obtained in an analogous manner.

This application is a division of our application Serial No. 371,832 filed December 26, 1940.

What we claim is:

1. A process of the character described, which comprises the steps of reacting an androstene-17-one of the formula

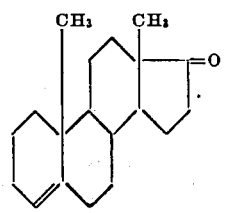

with a metallo-hydrocarbon compound and with a hydrolyzing agent, whereby the group

in the 17-position is converted into the group

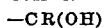

R standing for a hydrocarbon radical.

2. A process of the character described, which comprises the steps of reacting an androstene-17-one of the formula

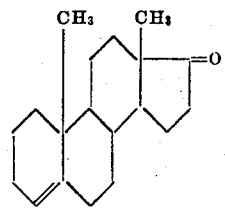

with a metallo-hydrocarbon compound and with a hydrolyzing agent, whereby the group

in the 17-position is converted into the group

R standing for a hydrocarbon radical, and then reacting the resultant compound with chromic acid, whereby a product of the formula

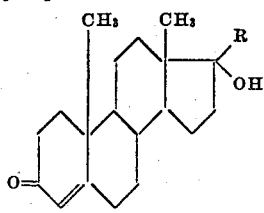

R representing the aforesaid hydrocarbon radical, results.

3. A process of the character described, which comprises the steps of reacting an androstene-17-one of the formula

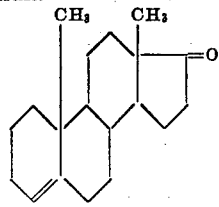

with an organo-metallic compound of the Grignard type and with a hydrolyzing agent, whereby the group

in the 17-position is converted into the group

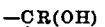

R standing for a hydrocarbon radical.

4. A process of the character described, which comprises the steps of reacting an androstene-17-one of the formula

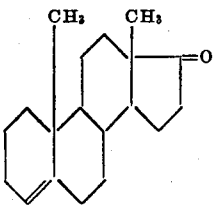

with a hydrocarbon-substituted metal halide and with a hydrolyzing agent, whereby the group

in the 17-position is converted into the group

R standing for a hydrocarbon radical.

5. A process of the character described, which comprises the steps of reacting $\Delta^4$-androstene-17-one with an alkyl magnesium halide and with a hydrolyzing agent, and then reacting the resultant $\Delta^4$-17-alkyl-androstene-17-ole with chromic acid to produce 17-alkyl testosterone.

6. A process of the character described, which comprises the steps of reacting $\Delta^4$-androstene-17-one with an alkyl magnesium halide and with a hydrolyzing agent, and then reacting the resultant $\Delta^4$-17-alkyl-androstene-17-ole with selenium dioxide to produce $\Delta^4$-17-alkyl-androstene-3:17-diole.

7. A process of the character described, which comprises the steps of reacting $\Delta^4$-androstene-17-one with methyl magnesium halide and with a hydrolyzing agent, and then reacting the resultant $\Delta^4$ - 17 - methyl - androstene-17-ol with chromic acid to produce 17-methyl testosterone.

8. A process of the character described, which comprises treating an androstene-17-one of the formula

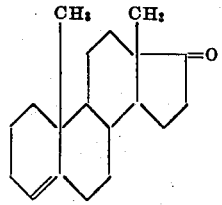

with a metallo-organic compound capable of transforming the group —CO— into the group —CCH$_3$(OH)—, and causing the product thus obtained to react with chromic acid.

9. A compound of the formula

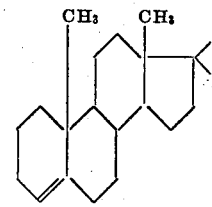

wherein R stands for a hydrocarbon radical and R' stands for a member of the group consisting of hydroxyl and a group which upon hydrolysis is converted into hydroxyl.

10. $\Delta^4$-17-methyl-androstene-17-ol of the formula

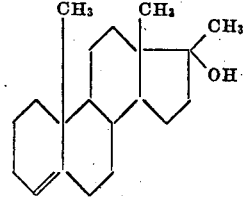

11. $\Delta^4$-17-ethinyl-androstene-17-ol of the formula

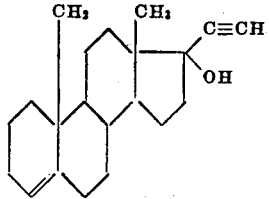

KARL MIESCHER.
ALBERT WETTSTEIN.